Patented Oct. 31, 1939

2,178,180

UNITED STATES PATENT OFFICE 2,178,180

METAL PASTE PIGMENT

Edwin L. McMahan, New Kensington, Pa., assignor to Aluminum Company of America, Pittsburgh, Pa., a corporation of Pennsylvania No Drawing. Application November 11, 1937, Serial No. 174,060

10 Claims. (Cl. 134—76)

This invention relates to improvements in the production of metal paste pigments, and more particularly to the production of aluminum paste pigments having improved stability of leafing power.

The metal paste pigments are generally prepared by subjecting the desired metal to a preliminary comminuting process to reduce it to a convenient, relatively large particle size. The comminuted metal particles are then placed in a ball mill or equivalent device, together with a liquid thinner, preferably mineral spirits, and a leafing agent such as stearic acid and/or palmitic acid. The ball mill is then operated until the repeated impact of the steel balls therein has reduced the metal charge to a sludge containing the metal pigment in very thin flake-like particles coated with the stearic acid or other leafing agent used. This sludge is removed from the ball mill and any excess of the liquid phase or thinner is removed, generally by filtration. By removal of this excess liquid it is possible to eliminate certain dark-colored colloidal particles formed during the milling operation which, if not removed, might detract from the value of the paste as a pigment. It is possible in this operation, if desired, to adjust the final product to the exact consistency preferred for the metal paste pigment for marketing. In practice, however, the thinner is generally removed until the residue constitutes a substantially dry filter cake which contains about 80% or more of the metal, the balance being retained thinner and leafing agent. The filter cake so produced is then generally adjusted to a metal content of about 60 to 70%, depending upon the use to which the final product is to be subjected, by the addition of a predetermined amount of fresh thinner liquid to the filter cake, with or without additional leafing agent. When this added thinner, with or without the leafing agent, has been thoroughly incorporated in the filter cake, there results a metal paste pigment which is suitable for admixture with a vehicle to form a satisfactory metal pigment paint.

In order to produce a satisfactory metal paste pigment, the metal particles must possess the property of leafing when the paste is mixed with a paint vehicle. When a good metal paste pigment is mixed with a satisfactory paint vehicle it will be observed that a continuous layer of the metal pigment forms on the surface of the vehicle when stirring is stopped. This phenomenon is known as leafing and imparts to metal pigment paint coatings smoothness, brightness and other desirable properties. The phenomenon of leafing is apparently one of surface tension directly attributable to the thin film of leafing agent formed on the surface of the individual metal flakes.

In the case of a metal powder pigment, such as an aluminum powder pigment, formed in a stamp mill, leafing power is generally imparted to the powder by the film of polishing agent applied to the surface of the metal particles in the polishing step of the process. On the other hand, in the case of a metal paste pigment, such as an aluminum paste pigment, the film is formed by specific agents added to the ball mill charge for the purpose of imparting leafing power to the metal particles, which agents are known in the art as leafing agents. These leafing agents are generally selected from the group of fatty acids, such as stearic acid, palmitic acid, or mixtures of these acids. The leafing agent is probably preferentially organized or molecularly oriented on the surface of the metal particles in some manner which promotes the leafing action. Alteration of these organized film either by chemical or physical action may result in loss of leafing power. For example, by simply heating an aluminum paste pigment in an oxygen-containing atmosphere to a temperature above about 50° C. the leafing power of the pigment may be substantially impaired.

While it has been recognized that the leafing power of aluminum powder may increase as a result of the aging process after the polishing operation, probably because preferred orientation of the molecules is taking place, it has been found that, with the exception of a brief period immediately following its formation, there is a tendency for an aluminum paste pigment to lose leafing power on aging. This is particularly true on long continued storage or storage at elevated temperatures or in the presence of moisture. This loss of leafing power in aluminum paste pigments is probably due to some modification of the film of leafing agent during the aging period.

It is an object of this invention to provide a stabilized metal paste pigment having improved persistence of leafing power.

It is more particularly an object of this invention to provide a stabilized aluminum paste pigment having improved persistence of leafing power.

This invention has as a further object the provision of a process for the production of metal paste pigments in which the ability of the metal pigment to leaf is substantially stabilized.

A further object of this invention is to afford a relatively simple method for increasing the persistence of leafing power of aluminum paste pigments by producing on the aluminum particles contained therein a substantially stable film of leafing agent.

I have found that by the addition to the leafing agent and thinner used in the production of metal paste pigments of certain organic aromatic chemical compounds, the film of leafing agent formed upon the metal flakes can be stabilized and the leafing power of the resulting paste improved so that it is maintained even under adverse conditions of storage to which the paste may be subjected. The compounds which I have found to be suitable stabilizing compounds for the purpose of my invention are compounds selected from the group consisting of alpha and beta naphthol or mixtures thereof. The amount of any one of these substances required to stabilize and substantially increase the persistence of leafing power of a metal paste pigment will vary with the particular substance used and with the amount of leafing agent present in the paste. In any case, the amount of stabilizing compound required is relatively small, and I have found that in most cases, by the addition of the stabilizing compounds in amounts on the order of about 0.002 to 0.1 per cent of the finished paste, satisfactory results can be obtained.

When using beta naphthol, I have found it generally preferable to use this compound in somewhat greater amounts than when alpha naphthol is used. I prefer, for example, to use beta naphthol in an amount corresponding to about 0.02 per cent by weight of an aluminum paste pigment containing approximately 1 per cent of stearic acid as a leafing agent, while the prefered amount of alpha naphthol for use with a similar paste is about 0.006 per cent by weight of the paste.

Although these stabilizing substances are not in themselves considered to be leafing agents, I have found that a small amount of these stabilizing compounds can be used to replace a substantial amount of the leafing agent without impairing the leafing power of the finished product and with a satisfactory production of persistence of leafing power. It is sometimes desirable, therefore, to use the leafing power stabilizing compounds of my invention in somewhat greater amounts than 0.1 per cent. Thus, for example, it may be desirable to replace a substantial part of the leafing agent with a stabilizing compound where a relatively large amount of leafing agent in the paste may be undesirable because of a low solubility in the mineral spirits thinner or for other reasons. For example, I have been able to produce satisfactory aluminum paste pigments at relatively low cost where as much as one-half of the usual amount of leafing agent was replaced with a small amount of stabilizing compound. I have obtained satisfactory results by replacement of substantial proportions of the leafing agent with as little as 1/20 to 1/10 of the weight of said portion of one or more of the stabilizing compounds of my invention.

In stabilizing the leafing power of metal paste pigments made by the ball mill process, such as those referred to above, the stabilizing compounds of my invention may be incorporated at any convenient point of the process. It is preferred to incorporate the stabilizing substances in the fresh thinner solution, with or without additional leafing agent employed to adjust the metal content of the substantially dry filter cake obtained after the filtration step. Satisfactory results have been obtained, however, when the stabilizing compound is incorporated as part of the charge in the ball mill, and when so added it functions to protect or stabilize the film of leafing agent from the time of application of the leafing agent to the metal flakes. Good results have likewise been obtained by the addition of the stabilizing compound both to the charge in the ball mill and to the filter cake used in making up the finished paste.

The following comparative tests will serve to illustrate the desirable results obtainable by the use of leafing power stabilizing compounds according to my invention. The comminuted aluminum was placed in a ball mill with a mineral spirits thinner and staric acid. It was reduced to a sludge containing flaked aluminum. The excess thinner was filtered from this sludge to produce a filter cake containing about 84 per cent of aluminum flakes, about 1.5 per cent of stearic acid, and about 14.5 per cent of mineral spirits. To a 95-gram portion of this aluminum pigment filter cake there were added 30 grams of a solution of mineral spirits containing 1.5 grams of stearic acid and 0.007 gram of alpha naphthol, and the whole mass was thoroughly mixed to form the finished paste. For comparison, to another 95-gram portion of the aluminum pigment filter cake there were added 30 grams of a solution of mineral spirits containing 1.5 grams of stearic acid and no alpha naphthol, and the whole mass was thoroughly mixed to form the finished paste. These two test portions were then subjected to identical test conditions to determine the relative stability of their leafing power. They were stored in containers at a constant temperature of 40° C. and in an atmosphere saturated with water vapor. These conditions represented highly abnormal storage conditions and provided an accelerated test of the relative persistence of leafing power of the two samples. The leafing power of each of the two samples was determined periodically throughout the test. The method used for determination of the leafing power was the standard spatula leafing test described in "Aluminum Paint and Powder", by J. D. Edwards, published in 1936 by Reinhold Publishing Corporation. After four days of exposure to these accelerated test conditions the sample containing no alpha naphthol showed a substantially complete loss of leafing power, whereas the sample containing alpha naphthol still retained satisfactory leafing power.

The term "aluminum" as used herein and in the appended claims is intended to include both aluminum and aluminum base alloys.

In my copending application for United States patent, Serial No. 174,059, filed November 11, 1937, there is described and claimed the use of phenolic compounds such as phenol, monobenzyl amino phenol, para-tertiary amyl phenol, and guaiaphene and the like, as stabilizing compounds for the production of metal paste pigments having improved persistence of leafing power. In my copending application for United States Patent, Serial No. 174,061, filed November 11, 1937, there is described and claimed the use of aniline and paraphenylene diamine as stabilizing compounds for the production of metal paste pigments having persistence of leafing power. In my copending application for United States patent, Serial No. 174,062, filed November 11, 1937, there is described and claimed the use of various amines, such as alpha naphthyl amine, beta naphthyl amine, monoamyl amine, diamyl amine, triamyl amine, and the like, as stabilizing compounds for the production of metal paste pigments having improved persistence of leafing power.

I claim:

1. A method for the production of metal paste pigments having improved persistence of leafing power, which comprises incorporating in said paste pigment at least one compound, capable of stabilizing the leafing power of the pigment, selected from the group consisting of alpha and beta naphthol.

2. A method for the production of an aluminum paste pigment having improved persistence of leafing power, which comprises incorporating in an aluminum paste pigment containing a fatty acid leafing agent at least one compound, capable of stabilizing the leafing power of the pigment, selected from the group consisting of alph and beta naphthol.

3. A method for the production of aluminum paste pigment having improved persistence of leafing power, which comprises incorporating in an aluminum paste pigment containing stearic acid at least one compound, capable of stabilizing the leafing power of the pigment, selected from the group consisting of alpha and beta naphthol.

4. A method for the production of aluminum paste pigment having improved persistence of leafing power, which comprises incorporating in an aluminum paste pigment containing stearic acid, 0.002 to 0.1 per cent of at least one compound capable of stabilizing the leafing power of the pigment, selected from the group consisting of alpha and beta naphthol.

5. A method for the production of aluminum paste pigment having improved persistence of leafing power, which comprises incorporating in an aluminum paste pigment containing stearic acid and a mineral spirits thinner, 0.002 to 0.1 per cent of at least one compound capable of stabilizing the leafing power of the pigment, selected from the group consisting of alpha and beta naphthol.

6. A stabilized metal paste pigment having improved persistence of leafing power, comprising metal flakes, a leafing agent, and a compound selected from the group consisting of alpha and beta naphthol.

7. A stabilized aluminum paste pigment having improved persistence of leafing power, comprising aluminum flakes, a leafing agent, and a compound selected from the group consisting of alpha and beta naphthol.

8. A stabilized aluminum paste pigment having improved persistence of leafing power, comprising aluminum flakes, stearic acid, and compound selected from the group consisting of alpha and beta naphthol.

9. A stabilized aluminum paste pigment having improved persistence of leafing power, comprising aluminum flakes, stearic acid, mineral spirits, and a compound selected from the group consisting of alpha and beta naphthol.

10. A stabilized aluminum paste pigment having improved persistence of leafing power, comprising aluminum flakes, stearic acid, mineral spirits, and 0.002 to 0.1 per cent of a compound selected from the group consisting of alpha and beta naphthol.

EDWIN L. McMAHAN.